(12) United States Patent
Yang (10) Patent No.: US 11,340,130 B2
(45) Date of Patent: May 24, 2022

(54) PRESSURE GAUGE

(71) Applicant: JIAO HSIUNG INDUSTRY CORP., New Taipei (TW)

(72) Inventor: Yung-Hao Yang, New Taipei (TW)

(73) Assignee: JIAO HSIUNG INDUSTRY CORP., New Taipei (TW)

( * ) Notice: Subject to any disclaimer, the term of this patent is extended or adjusted under 35 U.S.C. 154(b) by 1064 days.

(21) Appl. No.: 15/963,314

(22) Filed: Apr. 26, 2018

(65) Prior Publication Data
US 2019/0323913 A1    Oct. 24, 2019

(30) Foreign Application Priority Data

Apr. 18, 2018 (TW) .................................. 107113190

(51) Int. Cl.
G01L 19/10 (2006.01)
G01L 19/16 (2006.01)

(52) U.S. Cl.
CPC .............. *G01L 19/10* (2013.01); *G01L 19/16* (2013.01)

(58) Field of Classification Search
CPC ......... G01L 19/10; G01L 19/16; G01L 7/166; G01L 7/163
See application file for complete search history.

(56) References Cited

U.S. PATENT DOCUMENTS

| | | | | |
|---|---|---|---|---|
| 394,520 A * | 12/1888 | Thornycroft | ............. | G08B 9/14 116/21 |
| 2,215,537 A * | 9/1940 | Bjong | ..................... | G01L 27/00 73/431 |
| 2,988,041 A * | 6/1961 | Schmitz, Jr. | ............. | G01K 5/70 374/207 |
| 3,036,466 A * | 5/1962 | Rose | ...................... | G01D 13/24 73/709 |
| 3,069,910 A * | 12/1962 | Hastings | .................... | G01L 7/04 73/742 |
| 3,397,319 A * | 8/1968 | Locke | .................... | H01H 35/24 250/231.19 |
| 3,975,959 A * | 8/1976 | Larkin | ..................... | G01L 7/166 116/271 |
| 4,058,016 A * | 11/1977 | Schwartz | ................ | G01L 19/14 73/431 |
| 4,449,412 A * | 5/1984 | Fallon | ..................... | G01L 7/043 73/756 |
| 4,827,764 A * | 5/1989 | Hwang | ................... | G01L 17/00 D10/86 |
| 4,970,899 A * | 11/1990 | Huang | .................... | G01L 7/166 73/744 |
| 5,965,822 A * | 10/1999 | Wu | ........................ | G01L 27/005 73/146.8 |

(Continued)

*Primary Examiner* — Nimeshkumar D Patel
*Assistant Examiner* — Tania Courson
(74) *Attorney, Agent, or Firm* — Pai Patent & Trademark Law Firm; Chao-Chang David Pai (57) ABSTRACT

A pressure gauge has a shell, a scale panel, an index pointer, a piston set, and a gear transmission set. The shell has a front end board, a back end board, and a piston base mounted on the inner surface of the back end board. The scale panel is mounted between the front end board of the shell and the back end board of the shell. The index pointer is mounted on a front surface of the scale panel. The piston set is mounted in the piston base of the shell. The gear transmission set is mounted between the back end board of the shell and the scale panel.

20 Claims, 8 Drawing Sheets

(56) References Cited

U.S. PATENT DOCUMENTS

| | | | | |
|---|---|---|---|---|
| 5,983,728 A * | 11/1999 | Weng | ............... | G01L 17/00 |
| | | | | 116/285 |
| 9,677,965 B2 * | 6/2017 | Sahara | ............... | B60C 19/00 |
| 2004/0113813 A1 * | 6/2004 | Henson | ............... | G01L 7/043 |
| | | | | 340/870.07 |

* cited by examiner

PRESSURE GAUGE

BACKGROUND OF THE INVENTION

1. Field of the Invention

The invention relates to a pressure gauge, and more particularly to a pressure gauge which can measure the pressure of fluid.

2. Description of Related Art

Figure 9:
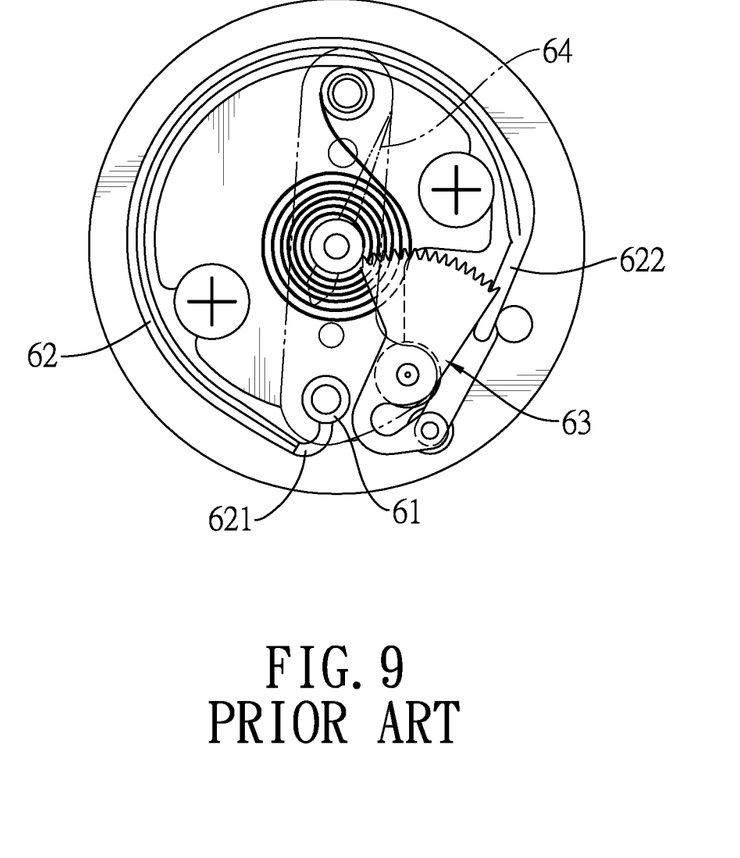
FIG. 9 is a top view of a conventional Bourdon type pressure gauge.

A pressure gauge is commonly applied for measuring pressures of fluids, such as gas or liquid in closed pipes. With reference to FIG. 9, one kind of conventional pressure gauge is a Bourdon tube type pressure gauge. The Bourdon tube type pressure gauge has an inlet pressure tube 61, a Bourdon tube 62, a transmission mechanism 63, and an index pointer 64. The inlet pressure tube 61 communicates with a closed tube. The Bourdon tube 62 is C-shaped and has an opening end 621 and a closed end 622. The opening end 621 of the Bourdon tube 62 is connected with and communicates with the inlet pressure tube 61. The closed end 622 of the Bourdon tube 62 is connected with the index pointer 64 via the transmission mechanism 63. When the fluid in the closed tube flows into the Bourdon tube 62 via the inlet pressure tube 61, the Bourdon tube 62 would extend outward and deform due to the pressure. This makes the closed end 622 of the Bourdon tube 62 drive the transmission mechanism 63 to turn the index pointer 64, and therefore, the index pointer may show the pressure value in the closed tube.

The drawback of using the Bourdon tube type pressure gauge is that the deformation of the Bourdon tube 62 is unstable at the initial stage of deformation and near the elastic limit. Therefore, when the measured pressure value is smaller than or close to the elastic limit of the Bourdon tube 62, the pressure value cannot be accurate.

U.S. Pat. No. 9,677,965 B2 entitled "PRESSURE GAUGE" discloses a pressure gauge having a shell, a shaft, a piston, and a gear. The shaft and the piston are mounted in the shell, and one end of the shaft extends out of the shell. The end extending from the shell of the shaft is connected with an index pointer. The gear is mounted around the shaft. A moving direction of the piston is perpendicular to the shaft. An outer end portion of the piston corresponds to a side opening of a side wall of the shell, and an inner end of the piston is connected to a rack via an extending portion. The rack engages with the gear. Therefore, when the fluid of the closed pipeline pushes the piston from the side opening of the shell, the shaft and the index pointer are driven to turn through the rack and the gear, thereby indicating the pressure value of the fluid in the sealed pipeline.

The problem of the above pressure gauge is that the piston needs to re-connect the rack to drive the gear and the shaft to rotate. The space occupied by the piston and the rack in the shell is large. Because of the space required for the actuation of the rack, the shell of the pressure gauge has a large size and cannot be further reduced, so a pressure gauge using a piston and a gear to drive the pointer to turn cannot be used in a small closed circuit.

SUMMARY OF THE INVENTION

The main objective of the present invention is to provide a pressure gauge that can measure the pressure of fluid.

The pressure gauge has a shell, a scale panel, an index pointer, a piston set, and a gear transmission set. The shell has a front end board, a back end board, and a piston base mounted on an inner surface of the back end board. The scale panel is mounted between the front end board of the shell and the back end board of the shell. The index pointer is mounted on a front surface of the scale panel. The piston set is mounted in the piston base of the shell. The gear transmission set is mounted between the back end board of the shell and the scale panel.

Other objects, advantages, and novel features of the invention will become more apparent from the following detailed description when taken in conjunction with the accompanying drawings.

DETAILED DESCRIPTION OF PREFERRED EMBODIMENT

Figure 1:
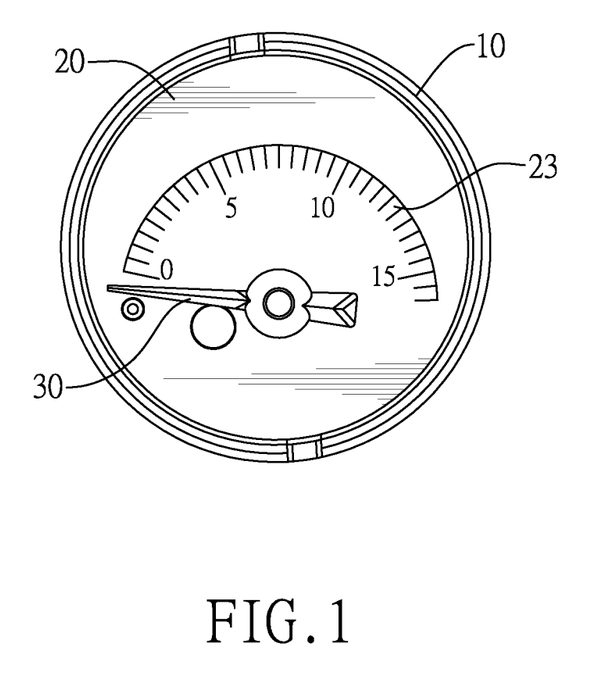
FIG. 1 is a top view of a pressure gauge in accordance with the present invention.
Figure 2:
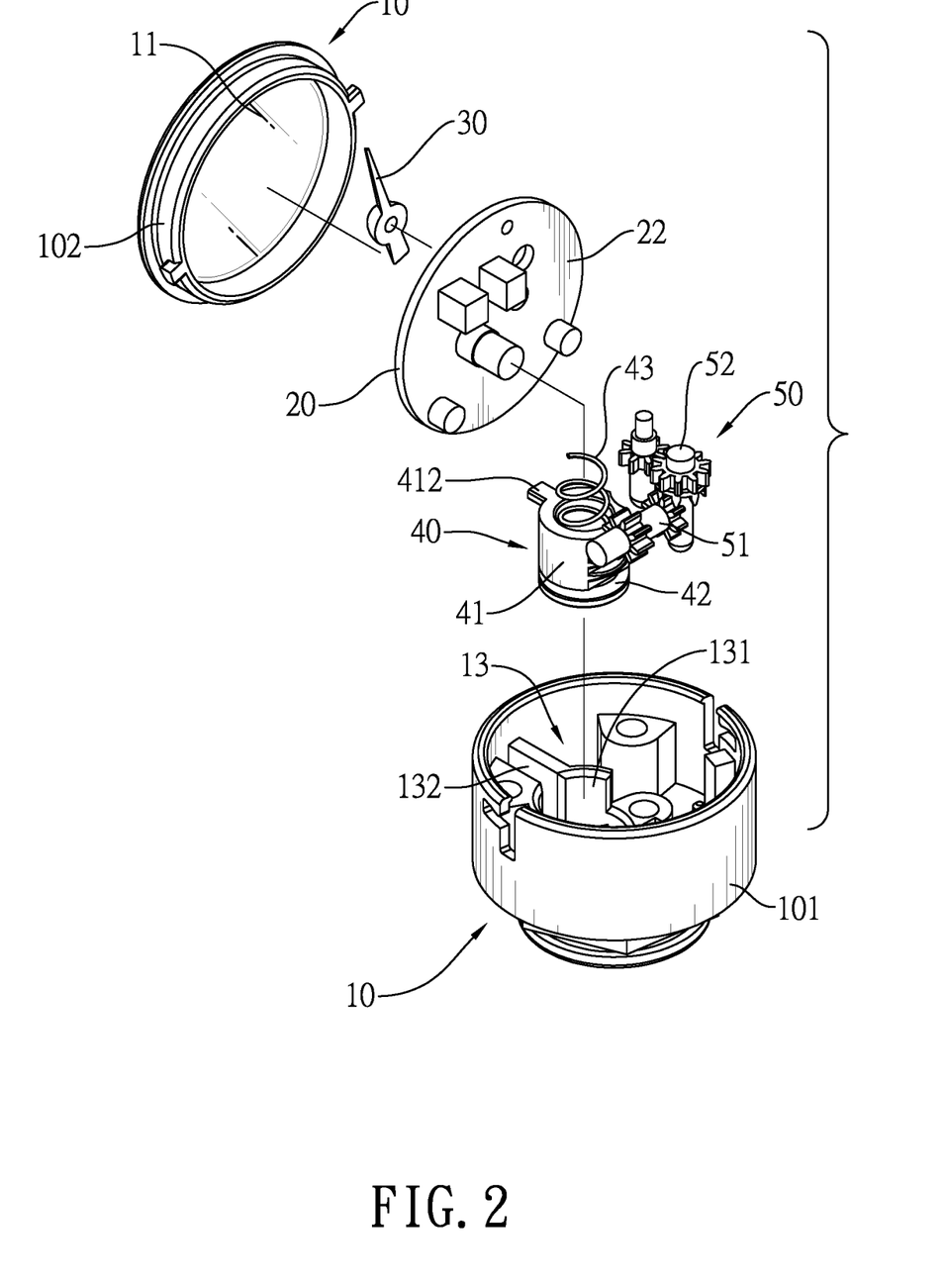
FIG. 2 is an exploded perspective view of the pressure gauge in FIG. 1.

With reference to FIGS. 1 and 2, a pressure gauge in accordance with the present invention comprises a shell 10, a scale panel 20, an index pointer 30, a piston set 40, and a gear transmission set 50.

Figure 4:
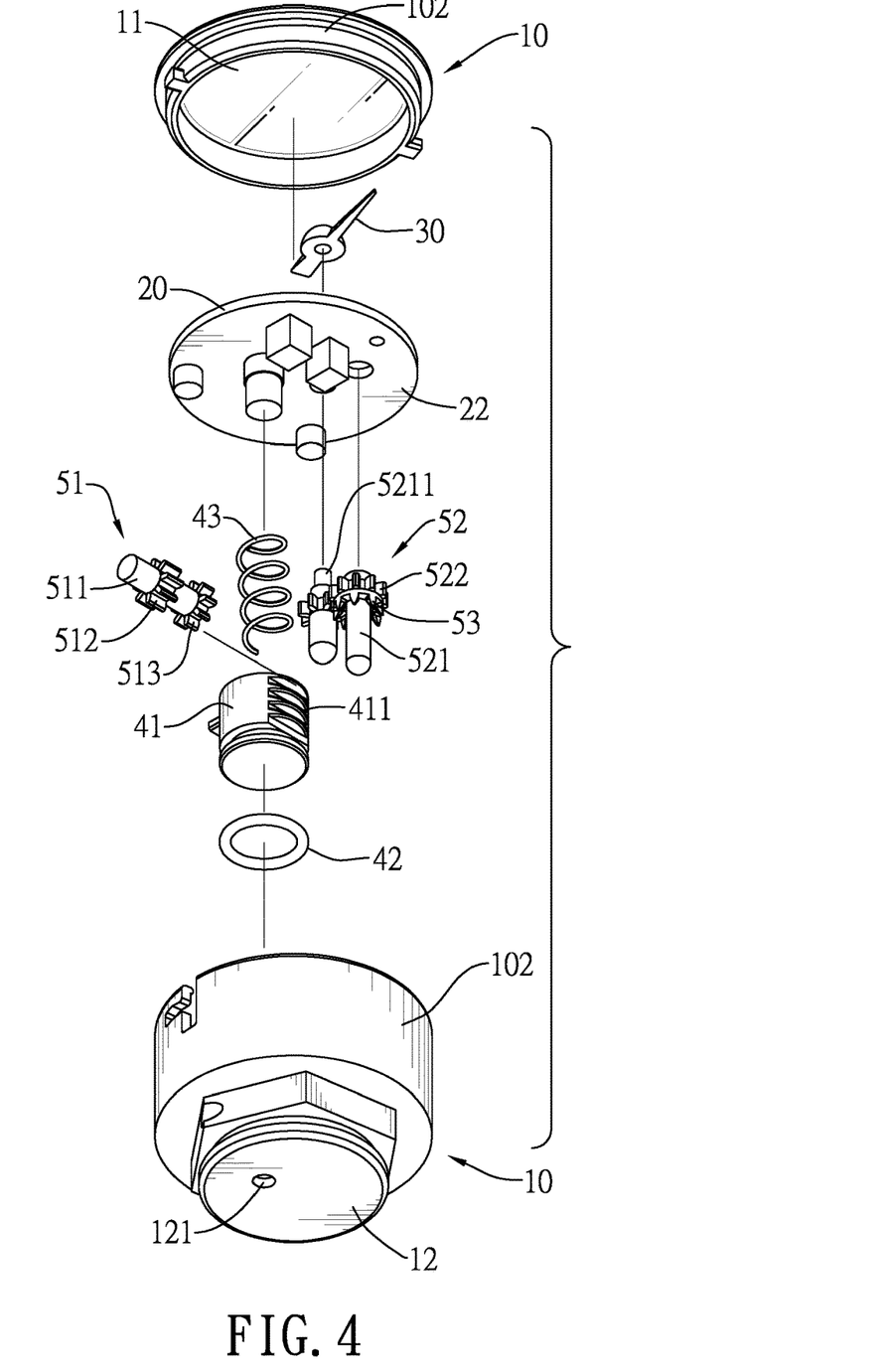
FIG. 4 is another exploded perspective view of the pressure gauge in FIG. 1.

With reference to FIGS. 1, 2, and 4, the shell 10 is a cylinder and has a front end board 11, a back end board 12, and a piston base 13. The shell 10 has a front side and a back side. The front end board 11 is mounted at the front side of the shell 10 and is transparent. The back end board 12 is mounted at the back side of the shell 10. The back end board 12 has an inner surface and a vent hole 121. The inner surface of the back end board 12 faces an interior of the shell 10. The vent hole 121 is formed through the back end board 12. The piston base 13 is mounted on the inner surface of the back end board 12 and has a guiding recess 131 and a limiting recess 132. The guiding recess 131 is formed in a top surface of the piston base 13 and is perpendicular to the back end board 12. The position of the guiding recess 131 corresponds to the position of the vent hole 121. The guiding recess 131 communicates with the vent hole 121. The limiting recess 132 is also perpendicular to the back end board 12, and the limiting recess 132 communicates with the vent hole 121.

In this embodiment, the shell 10 has a receiving cylinder 101 and a side cover 102. The receiving cylinder 101 has a first end and a second end. The first end of the receiving cylinder 101 is an opening. The back end board 12 is mounted at the second end of the receiving cylinder 101. The front end board 11 is mounted at the side cover 102. The side cover 102 covers the opening of the receiving cylinder 101 and is mounted to the receiving cylinder 101.

With reference to FIGS. 1, 2, 4, and 6, the scale panel 20 is mounted between the front end board 11 of the shell 10 and the back end board 12 of the shell 10. Specifically, the scale panel 20 is mounted between the side cover 102 of the shell 10 and the piston base 13. The scale panel 20 has a front surface 21 and a back surface 22. The front surface 21 of the scale panel 20 faces the front end board 11. Scales 23 are formed on the front surface 21 of the scale panel 20, and the scales 23 may display the pressure value. The back surface 22 of the scale panel 20 faces the back end board 12.

The index pointer 30 is mounted on the front surface 21 of the scale panel 20.

Figure 3:
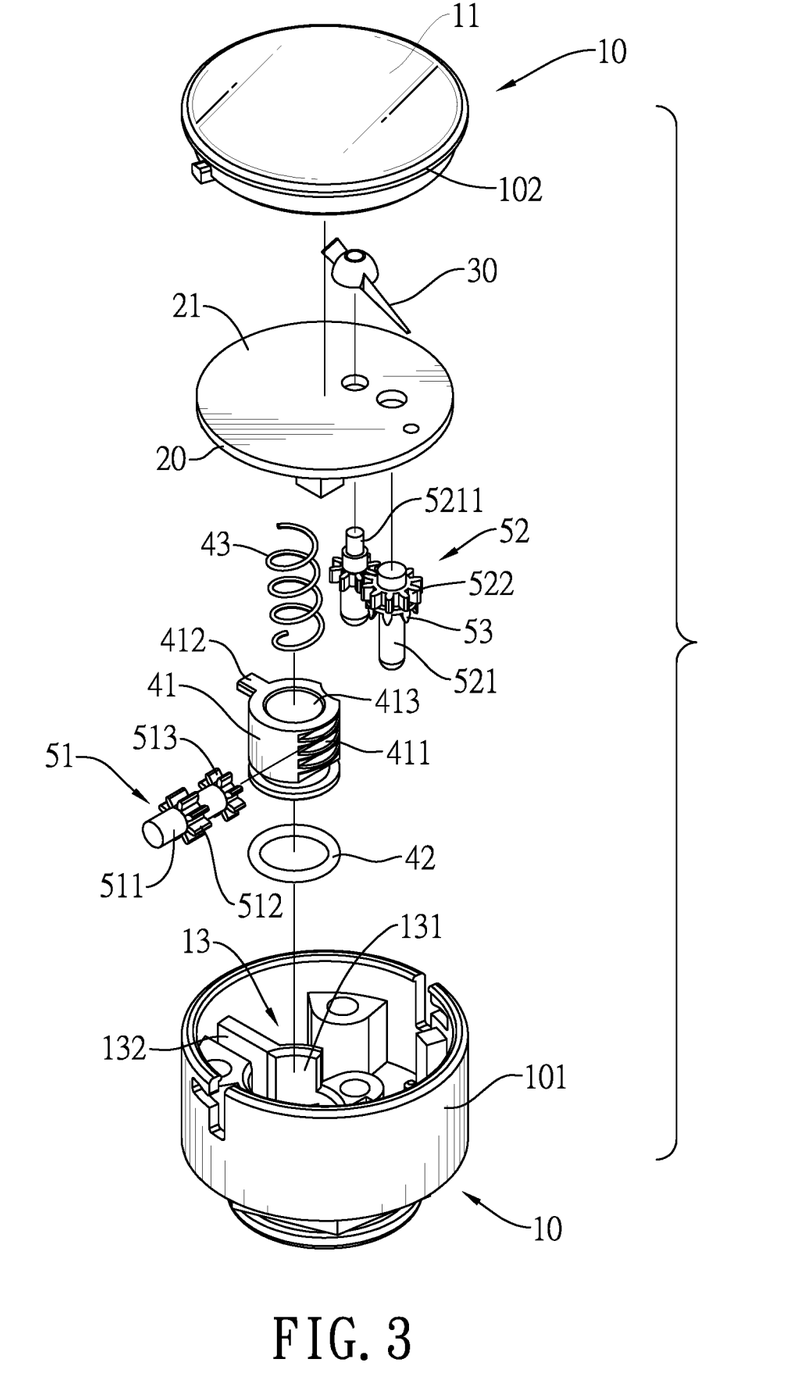
FIG. 3 is another exploded perspective view of the pressure gauge in FIG. 1.
Figure 5:
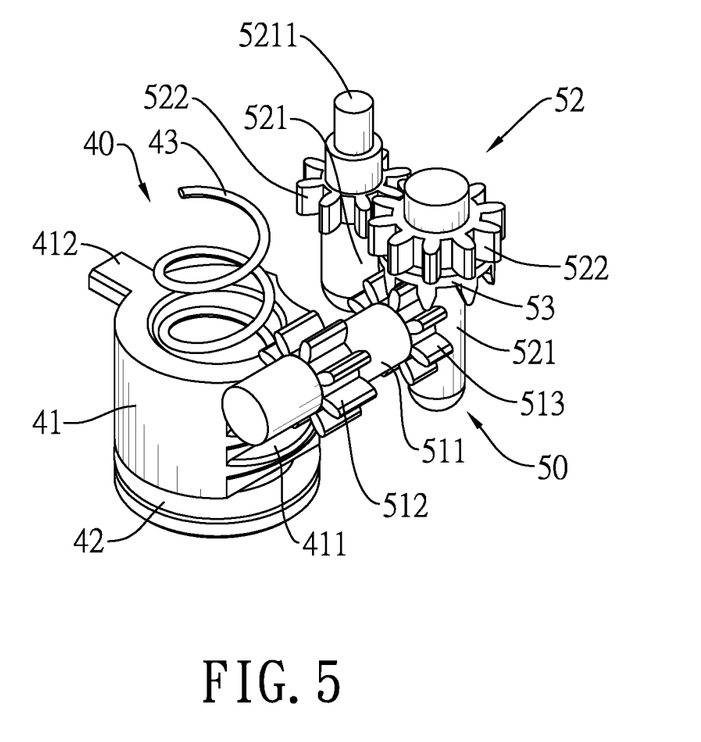
FIG. 5 is a perspective view of a piston set and a gear transmission set of the pressure gauge in FIG. 1.
Figure 6:
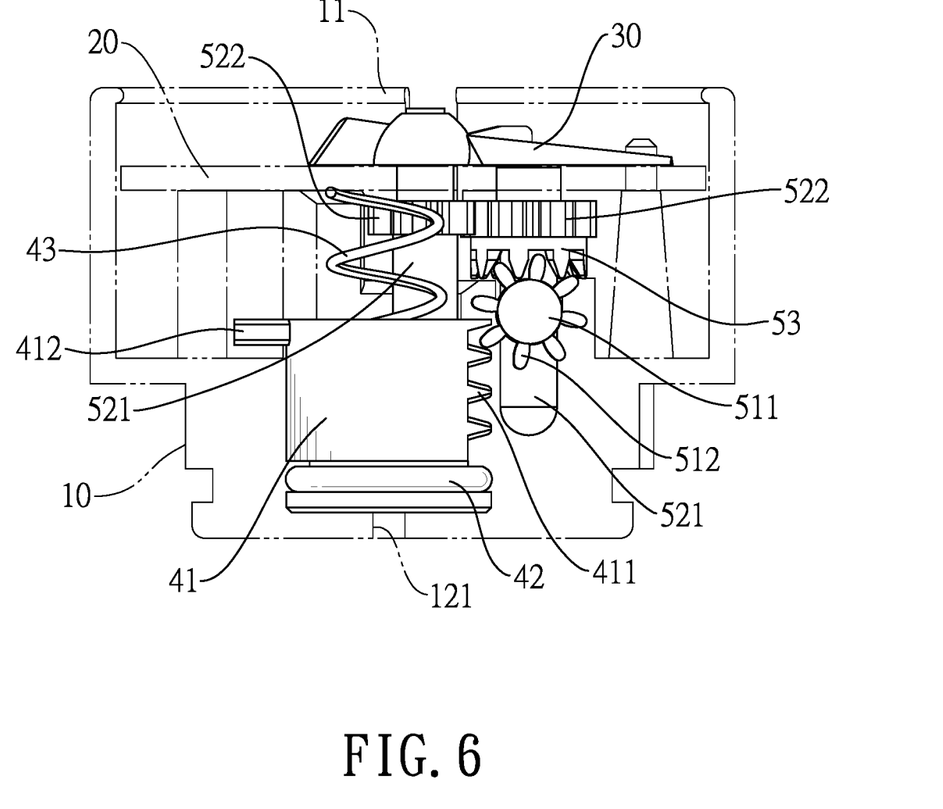
FIG. 6 is a side view of the pressure gauge in FIG. 1.
Figure 7:
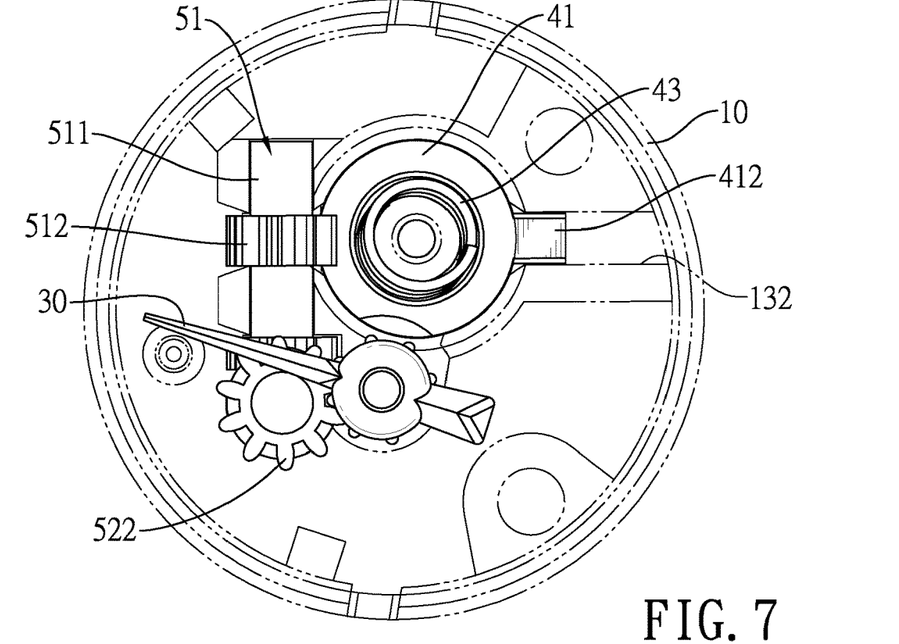
FIG. 7 is another top view of the pressure gauge in FIG. 1.
Figure 8:
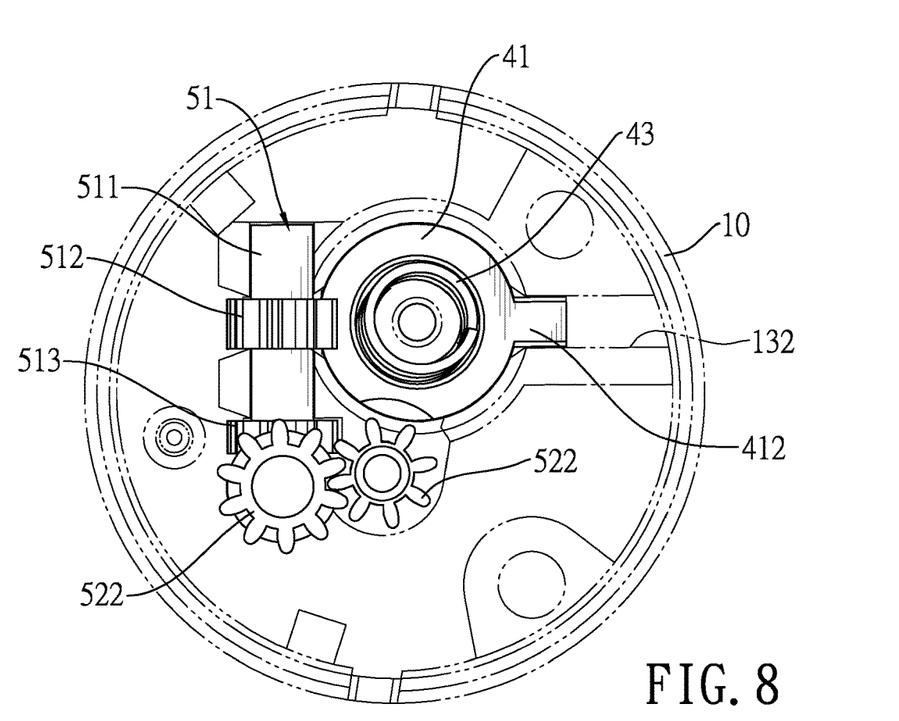
FIG. 8 is another top view of the pressure gauge in FIG. 1, shown without an index pointer.

With reference to FIGS. 3 and 5, the piston set 40 is mounted in the piston base 13 of the shell 10 and has a plug 41, a piston ring 42, and an elastic element 43.

The plug 41 is mounted in the guiding recess 131 of the piston base 13. The plug 41 may be moved between the back end board 12 of the shell 10 and the scale panel 20. The plug 41 has a surrounding wall, a front end portion, a back end portion, a gear rack portion 411, and a positioning block 412. The front end portion of the plug 41 faces the scale panel 20. The back end portion of the plug 41 faces the back end board 12 of the shell 10. The gear rack portion 411 is formed on the surrounding wall of the plug 41. Teeth of the gear rack portion 411 are arranged along a moving direction of the plug 41. The positioning block 412 protrudes from the surrounding wall of the plug 41, and the positioning block 412 is inserted into the limiting recess 132 of the piston base 13. Therefore, the plug 41 may only move in a linear direction between the back end board 12 of the shell 10 and the scale panel 20.

The piston ring 42 is mounted around the plug 41 and is located between the back end portion and the gear rack portion 411 of the plug 41. The piston ring 42 abuts a wall of the guiding recess 131 in an airtight manner.

The elastic element 43 is mounted between the plug 41 and the scale panel 20. The elastic element 43 has two ends respectively abutting the plug 41 and the scale panel 20. The elastic element 43 would push the plug 41 toward the back end board 12 of the shell 10. Specifically, the elastic element 43 is a compression spring. In this embodiment, the plug 41 further has a mounting recess 413 formed in the front end portion. The elastic element 43 is mounted in the mounting recess 413 of the plug 41.

With reference to FIGS. 5 to 8, the gear transmission set 50 is mounted between the back end board 12 of the shell 10 and the scale panel 20. The gear transmission set 50 is connected with the plug 41 and is mounted through the scale panel 20. The gear transmission set 50 is connected with the index pointer 30. The gear transmission set 50 is driven by the plug 41 and drives the index pointer 30 to turn. Specifically, the gear transmission set 50 has a first transmission element 51, at least one second transmission element 52, and a transmission gear 53.

The first transmission element 51 has a first pillar 511, an input gear 512, and a driving gear 513. The input gear 512 and the driving gear 513 are formed around the first pillar 51. The input gear 512 is engaged with the gear rack portion 411 of the plug 41. When the plug 41 moves back and forth in a straight line, the plug 41 may drive the first transmission element 51 to rotate.

Each one of the at least one second transmission element 52 has a second pillar 521. One of the at least one second transmission element 52 has an output end 5211. The output end 5211 is mounted through the scale panel 20 and is connected with the index pointer 30, and this makes the index pointer 30 pivot with respect to the second pillar 521.

Specifically, when the at least one second transmission element 52 includes multiple transmission elements 52, the second pillars 521 of the multiple transmission elements 52 are adjacent and parallel to each other. Each second pillar 521 has a driven gear 522 formed around an outer surface of the second pillar 521. The driven gears 522 of two adjacent second transmission elements 52 are engaged with each other, and this makes the second transmission elements 52 rotate synchronously.

The transmission gear 53 is formed around the second pillar 521 of one of the at least one second transmission element 52. The transmission gear 53 is engaged with the driving gear 513 of the first transmission element 51. Therefore, when the first transmission element 51 is rotated, the first transmission element 51 may drive the at least one second transmission element 52 to rotate via the transmission gear 53 directly or indirectly, and drives the index pointer 30 to turn.

In this embodiment, the driving gear 513 of the first transmission element 51 is a straight-cut gear, and the transmission gear 53 is a crown gear. By the cooperation of the straight-cut gear and the crown gear, the first transmission element 51 can rotate the second transmission element 52. Alternatively, the driving gear 513 of the first transmission element 51 and the transmission gear 53 may be bevel gears.

In this embodiment, the at least one second transmission element 52 includes two second transmission elements 52. The two second transmission elements 52 rotate at the same time by the engagement of the two driven gears 522.

When the pressure gauge in accordance with the present invention is in use, the fluid would press the plug 41 via the vent hole 121 of the shell 10, and the plug 41 would drive the index pointer 30 to turn via the gear transmission set 50. When the pressure value of the fluid is larger, the pressed distance of the plug 41 is longer, and the deflection angle of the index pointer 30 is larger. Therefore, the pressure value of the fluid can be shown. After the pressure of the fluid is released, the elastic element 43 will push the plug 41 to reset to an initial position. The plug 41 will drive the index pointer 30 to turn in reverse by the gear transmission set 50 and to return to zero. Since the pressure gauge of the present invention reflects the pressure value of the fluid according to the linear pressed distance that the plug 41, it is easy to select the elastic element 43 to have the appropriate elasticity coefficient.

Furthermore, the gear rack portion 411 of the plug 41 can drive the gear transmission set 50 to operate, so the piston set 40 and the gear transmission set 50 can be compact in structure. Therefore, the pressure gauge in accordance with the present invention can be made in a small size, and can be applied in a small closed tube.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A pressure gauge comprising:
   a shell having
      a front end board being transparent;
      a back end board having
         an inner surface; and a vent hole formed through the back end board;
a piston base mounted on the inner surface of the back end board and having
a guiding recess formed in a top surface of the piston base and being perpendicular to the back end board, and a position of the guiding recess corresponding to a position of the vent hole;
a scale panel mounted between the front end board of the shell and the back end board of the shell;
an index pointer mounted on a front surface of the scale panel;
a piston set mounted in the piston base of the shell and having
a plug mounted in the guiding recess of the piston base, being movable between the back end board of the shell and the scale panel, and having
a surrounding wall;
a front end portion;
a back end portion; and
a gear rack portion formed on the surrounding wall of the plug, and teeth of the gear rack portion arranged along a moving direction of the plug;
a piston ring mounted around the plug, located between the back end portion and the gear rack portion of the plug, and abutting a wall of the guiding recess in an airtight manner; and
an elastic element mounted between the plug and the scale panel and having
two ends respectively abutting the plug and the scale panel; and
a gear transmission set mounted between the back end board of the shell and the scale panel, connected with the plug, mounted through the scale panel, and connected with the index pointer.

2. The pressure gauge as claimed in claim 1, wherein the gear transmission set has
a first transmission element having
a first pillar;
an input gear formed around the first pillar and engaged with the gear rack portion of the plug; and
a driving gear formed around the first pillar;
at least one second transmission element, and each one of the at least one second transmission element having
a second pillar, wherein one of the at least one second transmission element has an output end mounted through the scale panel and connected with the index pointer; and
a transmission gear formed around the second pillar of one of the at least one second transmission element and engaged with the driving gear of the first transmission element.

3. The pressure gauge as claimed in claim 2, wherein the piston base of the shell has
a limiting recess formed in the piston base, being perpendicular to the back end board, and communicating with the vent hole;
the plug of the piston set has
a positioning block protruding from the surrounding wall of the plug and inserted into the limiting recess.

4. The pressure gauge as claimed in claim 1, wherein the piston base of the shell has
a limiting recess formed in the piston base, being perpendicular to the back end board, and communicating with the vent hole; and
the plug of the piston set has
a positioning block protruding from the surrounding wall of the plug and inserted into the limiting recess.

5. The pressure gauge as claimed in claim 2, wherein the shell has
a receiving cylinder having
a first end having an opening; and
a second end, the back end board mounted at the second end of the receiving cylinder;
a side cover covering the opening of the receiving cylinder and mounted to the receiving cylinder; and
the front end board is mounted at the side cover.

6. The pressure gauge as claimed in claim 5, wherein the scale panel is mounted between the side cover of the shell and the piston base.

7. The pressure gauge as claimed in claim 1, wherein the shell has
a receiving cylinder having
a first end having an opening; and
a second end, and the back end board mounted at the second end of the receiving cylinder;
a side cover covering the opening of the receiving cylinder and mounted to the receiving cylinder; and
the front end board is mounted at the side cover.

8. The pressure gauge as claimed in claim 7, wherein the scale panel is mounted between the side cover of the shell and the piston base.

9. The pressure gauge as claimed in claim 2, wherein the least one second transmission element includes two transmission second elements, the second pillars of the two second transmission elements are adjacent and parallel to each other, the second pillar of each second transmission element has a driven gear formed around an outer surface of the second pillar, and the driven gears of the two second transmission elements are engaged with each other.

10. The pressure gauge as claimed in claim 9, wherein the piston base of the shell has
a limiting recess formed in the piston base, being perpendicular to the back end board, and communicating with the vent hole;
the plug of the piston set has
a positioning block protruding from the surrounding wall of the plug and inserted into the limiting recess.

11. The pressure gauge as claimed in claim 9, wherein the shell has
a receiving cylinder having
a first end having an opening; and
a second end, the back end board mounted at the second end of the receiving cylinder;
a side cover covering the opening of the receiving cylinder and mounted to the receiving cylinder; and
the front end board is mounted at the side cover.

12. The pressure gauge as claimed in claim 11, wherein the scale panel is mounted between the side cover of the shell and the piston base.

13. The pressure gauge as claimed in claim 2, wherein the driving gear of the first transmission element is a straight-cut gear, and the transmission gear is a crown gear.

14. The pressure gauge as claimed in claim 13, wherein the least one second transmission element includes two second transmission elements, the second pillars of the two second transmission elements are adjacent and parallel to each other, each second pillar has a driven gear formed around an outer surface of each second pillar, and the driven gears of two adjacent second transmission elements engage with each other.

15. The pressure gauge as claimed in claim 14, wherein the piston base of the shell has a limiting recess formed in the piston base, being perpendicular to the back end board, and communicating with the vent hole;

the plug of the piston set has a positioning block protruding from the surrounding wall of the plug and inserted into the limiting recess.

16. The pressure gauge as claimed in claim 14, wherein the shell has a receiving cylinder having
- a first end having an opening; and
- a second end, the back end board mounted at the second end of the receiving cylinder;
- a side cover covering the opening of the receiving cylinder and mounted to the receiving cylinder; and the front end board is mounted at the side cover.

17. The pressure gauge as claimed in claim 16, wherein the scale panel is mounted between the side cover of the shell and the piston base.

18. The pressure gauge as claimed in claim 13, wherein the piston base of the shell has a limiting recess formed in the piston base, being perpendicular to the back end board, and communicating with the vent hole;

the plug of the piston set has a positioning block protruding from the surrounding wall of the plug and inserted into the limiting recess.

19. The pressure gauge as claimed in claim 13, wherein the shell has a receiving cylinder having
- a first end having an opening; and
- a second end, the back end board mounted at the second end of the receiving cylinder;
- a side cover covering the opening of the receiving cylinder and mounted to the receiving cylinder; and the front end board is mounted at the side cover.

20. The pressure gauge as claimed in claim 19, wherein the scale panel is mounted between the side cover of the shell and the piston base.

\* \* \* \* \*